(12) United States Patent
Zhou et al.

(10) Patent No.: US 12,137,418 B2
(45) Date of Patent: Nov. 5, 2024

(54) METHOD AND APPARATUS FOR ENTERING SLEEP MODE, STORAGE MEDIUM AND USER EQUIPMENT

(71) Applicant: SPREADTRUM COMMUNICATIONS (SHANGHAI) CO., LTD., Shanghai (CN)

(72) Inventors: Huayu Zhou, Shanghai (CN); Yin Yang, Shanghai (CN); Kai Zhang, Shanghai (CN); Cheng Wang, Shanghai (CN); Xingya Shen, Shanghai (CN); Meng Zhang, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 355 days.

(21) Appl. No.: 17/568,803

(22) Filed: Jan. 5, 2022

(65) Prior Publication Data

US 2022/0132426 A1    Apr. 28, 2022

Related U.S. Application Data

(63) Continuation of application No. PCT/CN2020/085298, filed on Apr. 17, 2020.

(30) Foreign Application Priority Data

Jul. 5, 2019  (CN) .......................... 201910604390.6

(51) Int. Cl.
*H04W 52/02*    (2009.01)
*H04L 1/00*    (2006.01)
(Continued)

(52) U.S. Cl.
CPC ....... *H04W 52/0235* (2013.01); *H04L 1/0061* (2013.01); *H04L 5/0053* (2013.01); *H04W 72/23* (2023.01)

(58) Field of Classification Search
CPC .............. H04W 52/0235; H04W 72/23; H04L 1/0061; H04L 5/0053
(Continued)

(56) References Cited

U.S. PATENT DOCUMENTS

2019/0239189 A1* 8/2019 Hwang ............. H04W 52/0229
2019/0297577 A1* 9/2019 Lin .................. H04W 52/0235
(Continued)

FOREIGN PATENT DOCUMENTS

| CN | 109219116 A | 1/2019 |
|---|---|---|
| CN | 109286968 A | 1/2019 |

(Continued)

OTHER PUBLICATIONS

Apple Inc., "Design of PDCCH-based Power Saving Signal and Channel", 3GPP TSG RAN WG1 Meeting#97; R1-1907345; May 13-17, 2019; 12 pages.
(Continued)

*Primary Examiner* — Mark G. Pannell
(74) *Attorney, Agent, or Firm* — CANTOR COLBURN LLP

(57) ABSTRACT

A method and apparatus for entering a sleep mode, a storage medium and a user equipment are provided. The method includes: monitoring a Physical Downlink Control Channel (PDCCH) and determining whether to enter a sleep mode, wherein entering the sleep mode includes skipping a duration of PDCCH monitoring occasions or modifying PDCCH configuration.

6 Claims, 2 Drawing Sheets a UE monitors a sleep PDCCH — S101 based on the sleep PDCCH being detected, the UE determines to enter the sleep mode; or based on the sleep PDCCH being detected, and sleep indication information in DCI transmitted by the sleep PDCCH indicating to enter the sleep mode, the UE determines to enter the sleep mode — S102

(51) Int. Cl.
*H04L 5/00* (2006.01)
*H04W 72/23* (2023.01)

(58) Field of Classification Search
USPC .................................................. 370/318
See application file for complete search history.

(56) References Cited

U.S. PATENT DOCUMENTS

| | | | |
|---|---|---|---|
| 2020/0029315 A1* | 1/2020 | Lin | H04W 72/23 |
| 2020/0037396 A1* | 1/2020 | Islam | H04W 52/0229 |
| 2020/0092813 A1* | 3/2020 | Kim | H04W 52/0274 |
| 2020/0092814 A1* | 3/2020 | Zhou | H04W 52/0235 |
| 2020/0169982 A1* | 5/2020 | Höglund | H04W 68/025 |
| 2020/0187237 A1* | 6/2020 | Su | H04L 1/08 |
| 2020/0204292 A1 | 6/2020 | Jiang et al. | |
| 2020/0229092 A1* | 7/2020 | Wu | H04W 52/0219 |
| 2020/0344722 A1* | 10/2020 | He | H04W 72/0446 |
| 2021/0168715 A1* | 6/2021 | Huang | H04W 24/08 |
| 2021/0306952 A1 | 9/2021 | Kuang et al. | |
| 2021/0329560 A1* | 10/2021 | Gao | H04W 52/0216 |
| 2021/0337477 A1* | 10/2021 | Chen | H04W 72/23 |
| 2021/0345393 A1* | 11/2021 | Xue | H04L 1/0053 |
| 2021/0368367 A1 | 11/2021 | Jiang et al. | |
| 2021/0368438 A1* | 11/2021 | Li | H04W 52/028 |
| 2022/0060986 A1* | 2/2022 | Tie | H04W 72/0453 |
| 2022/0095220 A1* | 3/2022 | Xue | H04W 52/0229 |
| 2022/0095228 A1* | 3/2022 | Sahin | H04L 27/2602 |
| 2022/0132474 A1* | 4/2022 | Sasaki | H04W 52/02 |
| 2022/0201605 A1* | 6/2022 | Yang | H04W 52/0235 |
| 2022/0217636 A1* | 7/2022 | Shrivastava | H04L 1/1812 |

FOREIGN PATENT DOCUMENTS

| | | |
|---|---|---|
| CN | 109952789 A | 6/2019 |
| CN | 109963326 A | 7/2019 |
| WO | 2017023370 A1 | 2/2017 |
| WO | 2019075641 A1 | 4/2019 |

OTHER PUBLICATIONS

CATT, "PDCCH skipping and switching of PDCCH monitoring periodicity", 3GPP TSG RAN WG1 Meeting#97 R1-1906353; May 13-17, 2019; 6 pages.

CATT, "Summary of PDCCH-based Power Saving Signal/Channel", 3GPP TSG RAN WG1 Meeting#97; R1-1907809; May 13-17, 2019; 10 pages.

HiSilicon, "Reduction of PDCCH monitoring for UE power saving", 3GPP TSG RAN WG1 Meeting #97; R1-1906592; May 13-17, 2019; 7 pages.

CATT, "Report on [105bis#27][NR/Power Saving]—PDCCH skipping", 3GPP TSG-RAN WG2 Meeting #106; R2-1905665; May 13-17, 2019; 24 pages.

International Search Report for International Application No. PCT/CN2020/085298; Date of Mailing; Jun. 30, 2020.

Media Tek Inc., "Design of PDCCH-based power saving signal/channel for NR", 3GPP TSG RAN WG1 Meeting #96-BisR1-1904487; Apr. 8-17, 2019; 11 pages.

Spreadtrum Communications, "Discussion on PDCCH-based power saving channel", 3GPP TSG RAN WG1 Meeting#97; R1-1906373; May 13-17, 2019; 13 pages.

Vivo, "Discussion on PDCCH monitoring skipping and PDCCH monitoring periodicity switch", 3GPP TSG RAN WG1 Meeting#97; R1-1906172; May 13-17, 2019; 4 pages.

Vivo, "PDCCH-based power saving signal/channel design", 3GPP TSG RAN WG1 Meeting#97; R1-1904103; May 13-17, 2019; 7 pages.

* cited by examiner

METHOD AND APPARATUS FOR ENTERING SLEEP MODE, STORAGE MEDIUM AND USER EQUIPMENT

CROSS-REFERENCE TO RELATED APPLICATIONS

This application is a continuation application under 35 U.S.C. § 120 of International Application No. PCT/CN2020/085298, filed on Apr. 17, 2020, which is incorporated herein by reference and which claimed priority to Chinese Patent Application No. 201910604390.6, filed on Jul. 5, 2019, the entire content of which is also incorporated herein by reference.

TECHNICAL FIELD

The present disclosure generally relates to communication technology field, and more particularly, to a method and apparatus for entering a sleep mode, a storage medium and a User Equipment (UE).

BACKGROUND

Generally, a UE in a connected state monitors a Physical Downlink Control Channel (PDCCH) merely in an active time of Discontinuous Reception (DRX) based on configuration of DRX or configuration of Extended Discontinuous Reception (eDRX). This allows the UE to sleep periodically, thereby saving power of the UE. The active time generally includes a running time of a timer such as onDurationTimer, drx-InactivityTimer, drx-RetransmissionTimer, drx-RetransmissionTimerShortTTI, drx-ULRetransmissionTimer, drx-ULRetransmissionTimerShortTTI or mac-ContentionResolutionTimer.

In some scenarios, such as scenarios where a packet arrival rate is low or where network congestion exists, for a given UE, no data is scheduled within a certain onDurationTimer, while the UE still monitors a PDCCH in the onDurationTimer, causing additional power consumption. In this case, a base station may instruct the UE not to monitor the PDCCH during the onDurationTimer via Go-To-Sleep (GTS) signaling. The GTS signaling may be a Media Access Control (MAC) layer command. For example, the base station may instruct the UE to stop the onDurationTimer via MAC Packet Data Unit (PDU) or MAC Control Element (CE).

SUMMARY

In embodiments of the present disclosure, GTS signaling may be optimized in a narrowband system.

In an embodiment of the present disclosure, a method for entering a sleep mode is provided, including: monitoring a PDCCH and determining whether to enter a sleep mode, wherein entering the sleep mode includes skipping a duration of PDCCH monitoring occasions or modifying PDCCH configuration.

Optionally, based on monitoring being completed on a PDCCH ending in frame n and it being determined to enter the sleep mode, the PDCCH is not monitored on any frame from (n+1)th to (n+k−1)th frames, where ACK/NACK feedback indicated by the PDCCH starts at an (n+k)th frame, and n and k are integers.

Optionally, based on monitoring being completed on a PDCCH ending in frame n and it being determined to enter the sleep mode, the PDCCH is not monitored on any frame from (n+1)th to (n+k−1)th frames, where a Physical Downlink Shared Channel (PDSCH) scheduled by the PDCCH ends at an (n+k)th frame, and n and k are integers.

Optionally, based on monitoring being completed on a PDCCH ending in frame n and it being determined to enter the sleep mode, the PDCCH is not monitored on any frame from (n+1)th to (n+k)th frames, where k is indicated by high-layer signaling, and n and k are integers.

Optionally, said monitoring a PDCCH and determining whether to enter a sleep mode includes: monitoring a sleep PDCCH; based on the sleep PDCCH being detected, determining to enter the sleep mode; or based on the sleep PDCCH being detected, and sleep indication information in Downlink Control Information (DCI) transmitted by the sleep PDCCH indicating to enter the sleep mode, determining to enter the sleep mode.

Optionally, said monitoring the sleep PDCCH includes: monitoring the sleep PDCCH on a sleep PDCCH monitoring occasion within active time.

Optionally, said monitoring the sleep PDCCH includes: monitoring the sleep PDCCH in a common search space, and descrambling Cyclic Redundancy Check (CRC) of the sleep PDCCH using a new Radio Network Temporary Identity (RNTI); and based on the descrambling succeeding, determining that the sleep PDCCH is detected.

Optionally, said determining whether to enter a sleep mode includes: based on the sleep PDCCH being detected, detecting a bit in a corresponding position in the sleep indication information to determine to enter the sleep mode.

Optionally, a number of bits of the sleep indication information is 30 or 56 which is configured via high-layer signaling.

Optionally, the sleep indication information includes an identity of a UE to enter the sleep mode.

Optionally, the identity of the UE is an index or a number of the UE.

Optionally, high-layer signaling enables monitoring of the sleep PDCCH.

Optionally, the method further includes: based on the sleep PDCCH being not detected, determining not to enter the sleep mode.

Optionally, the method includes: monitoring the PDCCH; and based on the PDCCH being detected and sleep indication information in DCI transmitted by the PDCCH indicating to enter the sleep mode, determining to enter the sleep mode.

Optionally, said monitoring the PDCCH includes: monitoring the PDCCH on a PDCCH monitoring occasion within active time.

Optionally, said monitoring the PDCCH includes: monitoring the PDCCH in a user-specific search space, and descrambling CRC of the PDCCH using a Cell-Radio Network Temporary Identity (C-RNTI); and based on the descrambling succeeding and the sleep indication information in the DCI transmitted by the PDCCH indicating to enter the sleep mode, determining to enter the sleep mode.

Optionally, the sleep indication information indicating to enter the sleep mode includes a newly added DCI field containing the sleep indication information, or an original DCI field indicating an invalid state.

Optionally, a DCI format of the sleep PDCCH is a DCI format used to schedule a PDSCH.

Optionally, the DCI format used to schedule the PDSCH includes a DCI format used to schedule a non-broadcast PDSCH.

Optionally, a size of the DCI is 56 bits.

Optionally, the DCI format used to schedule the PDSCH includes a DCI format used to schedule a broadcast PDSCH.

Optionally, a size of the DCI is 30 bits.

Optionally, prior to monitoring the PDCCH, the method further includes: determining whether to modify the PDCCH configuration after entering the sleep mode based on high-layer signaling from a base station.

Optionally, the high-layer signaling indicates whether to modify a PDCCH monitoring cycle, wherein a modified PDCCH monitoring cycle is longer than the PDCCH monitoring cycle before a UE enters the sleep mode.

Optionally, the high-layer signaling includes a multiple of the PDCCH monitoring cycle before the UE enters the sleep mode.

Optionally, high-layer signaling indicates whether to modify the PDCCH configuration after a UE enters the sleep mode.

Optionally, the DCI further includes first resource indication information to indicate to a UE a number of carriers of PDCCH monitoring, a start position of the carriers, and/or a maximum number of repetitions of the carriers after entering the sleep mode.

Optionally, high-layer signaling enables indication of the sleep indication information.

In an embodiment of the present disclosure, a storage medium having computer instructions stored therein is provided, wherein when the computer instructions are executed, the above method for entering a sleep mode is performed.

In an embodiment of the present disclosure, a UE including a memory and a processor is provided, wherein the memory has computer instructions stored therein, and when the processor executes the computer instructions, the above method for entering a sleep mode is performed.

DETAILED DESCRIPTION

In a narrowband system, there are few time-frequency resources. If a UE is instructed to enter a sleep mode via a MAC layer command, PDCCH and Physical Downlink Shared Channel (PDSCH) resources are consumed. Therefore, how to optimize GTS signaling in the narrowband system is an urgent problem to be solved.

In embodiments of the present disclosure, whether to enter a sleep mode is determined by monitoring a PDCCH. On one hand, power consumption of UEs may be reduced in scenarios having a low packet arrival rate or network congestion. On the other hand, there is no need to use MAC layer commands to instruct UEs to enter a sleep mode, thereby saving time and frequency resources.

The embodiments of the present disclosure are applicable to 5G communication systems, 4G and 3G communication systems, and various new communication systems in the future, such as 6G and 7G communication systems.

In order to clarify the objects, characteristics and advantages of the disclosure, embodiments of present disclosure will be described in detail in conjunction with accompanying drawings.

A method for entering a sleep mode provided in an embodiment may be applied at a UE side. That is, the UE may perform the method for entering the sleep mode.

In some embodiments, the UE may be located in a narrowband system.

In some embodiments, the UE may monitor a PDCCH and determine whether to enter the sleep mode, where entering the sleep mode includes skipping a duration of PDCCH monitoring occasions or modifying PDCCH configuration.

In some embodiments, modifying the PDCCH configuration may include modifying a monitoring cycle of the PDCCH to reduce a number of times of monitoring the PDCCH within active time or an on duration timer. Specifically, reducing the number of times of monitoring the PDCCH may include monitoring the PDCCH by adopting a new monitoring cycle longer than an original monitoring cycle.

Figure 1:
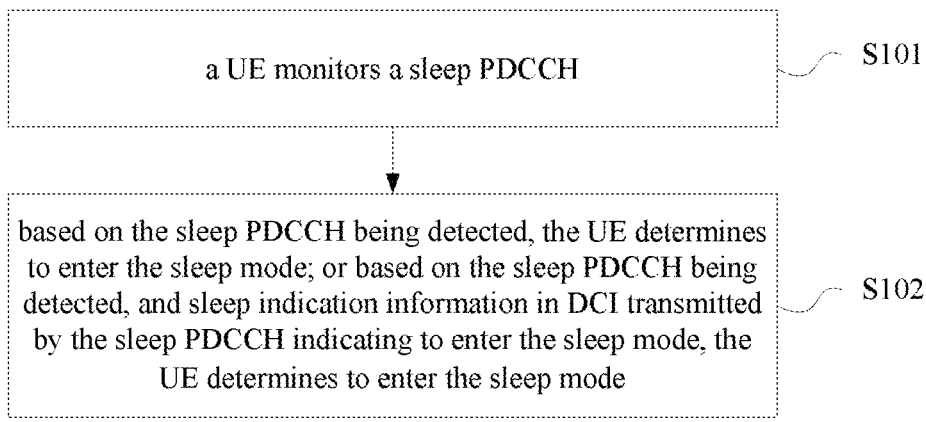
FIG. 1 is a flow chart of a method for entering a sleep mode according to an embodiment.

Referring to FIG. 1, FIG. 1 is a flow chart of a method for entering sleep mode according to an embodiment.

The method may include S101 and S102.

In S101, a UE monitors a sleep PDCCH.

In S102, based on the sleep PDCCH being detected, the UE determines to enter the sleep mode; or based on the sleep PDCCH being detected, and sleep indication information in DCI transmitted by the sleep PDCCH indicating to enter the sleep mode, the UE determines to enter the sleep mode.

It should be noted that, sequence numbers of steps in the embodiments of the present disclosure do not limit an execution order of the steps.

In some embodiments, based on monitoring being completed on a PDCCH ending in frame n and it being determined to enter the sleep mode, the UE does not need to monitor the PDCCH on any frame from (n+1)th to (n+k−1)th frames, that is, the UE skips the PDCCH monitoring occasions from (n+1)th to (n+k−1)th frames, where Acknowledgement/Negative-Acknowledgment (ACK/NACK) feedback indicated by the PDCCH starts at an (n+k)th frame. The ACK/NACK feedback belongs to HARQ feedback. In this manner, service may be maintained while power may be saved.

In some embodiments, based on monitoring being completed on a PDCCH ending in frame n and it being determined to enter the sleep mode, the UE does not need to monitor the PDCCH on any frame from (n+1)th to (n+k−1)th frames, that is, the UE skips the PDCCH monitoring occasions from (n+1)th to (n+k−1)th frames, where a PDSCH scheduled by the PDCCH ends at an (n+k)th frame. In this manner, service may be maintained while power may be saved.

In some embodiments, based on monitoring being completed on a PDCCH ending in frame n and it being determined to enter the sleep mode, the UE does not need to monitor the PDCCH on any frame from (n+1)th to (n+k)th frames, that is, the UE skips the PDCCH monitoring occasions from (n+1)th to (n+k)th frames, where k is indicated by high-layer signaling. When resources are tight, the base station may inform the UE in advance that there is no PDCCH scheduling for a time period. In some embodiments, the base station may configure N possible k values through MAC CE or RRC signaling, and dynamically indicate one of the N values through PDCCH. In this manner, flexibility may be ensured, and signaling overhead may be reduced.

In some embodiments, based on monitoring being completed on a PDCCH ending in frame n and it being determined to enter the sleep mode, the UE does not need to monitor the PDCCH on any frame from (n+1)th to (n+k−1)th frames, that is, the UE skips the PDCCH monitoring occasions from (n+1)th to (n+k−1)th frames, where k is indicated by high-layer signaling. When resources are tight, the base station may inform the UE in advance that there is no PDCCH scheduling for a time period.

In some embodiments, the UE may monitor a sleep PDCCH and be capable of determining whether the sleep PDCCH is detected. Based on the sleep PDCCH being detected, the UE determines to enter the sleep mode. In some embodiments, the UE may monitor a sleep PDCCH and be capable of determining whether the sleep PDCCH is detected. Based on the sleep PDCCH being detected, and sleep indication information in DCI transmitted by the sleep PDCCH indicating to enter the sleep mode, the UE uses a new RNTI to descramble CRC of the sleep PDCCH, where the sleep indication information is information capable of indicating whether the UE enters the sleep mode. Based on the descrambling succeeding, the UE determines that the sleep PDCCH is detected. The UE entering the sleep mode includes the UE skipping a duration of PDCCH monitoring occasions.

In some embodiments, in S101, the UE may monitor the sleep PDCCH at a sleep PDCCH monitoring occasion within active time, so as not to increase PDCCH monitoring occasions and power consumption of the UE.

In some embodiments, S101 may include: determining a first PDCCH to be monitored at the start of active time or on duration as the sleep PDCCH; or determining the sleep PDCCH within a subset of PDCCH monitoring occasions within the active time or the on duration.

In the embodiments, the sleep PDCCH monitoring occasions of the UE are limited, and specifically, the sleep PDCCH may be the first PDCCH to be monitored within an on duration timer. As the PDCCH monitoring occasions within the on duration timer are determined, the sleep PDCCH monitoring occasions may be a subset of the PDCCH monitoring occasions within the on duration timer, thereby further reducing power consumption of the UE.

Specifically, based on the UE not detecting the sleep PDCCH in S101, it is determined not to enter the sleep mode.

In S101, the sleep PDCCH is monitored, and in S102, it is determined whether to enter the sleep mode.

In some embodiments, before S101, higher layer signaling enables monitoring of the sleep PDCCH. Based on the UE receiving high-layer signaling not to enable monitoring of the sleep PDCCH, the UE does not perform S101, so that the base station is flexible to instruct the UE that does not need to save power to not enable monitoring of the sleep PDCCH.

Further, higher layer signaling enables indication of the sleep indication information.

In some embodiments, if a duration of an on duration timer in a DRX cycle is shorter than a preset time threshold, the UE does not monitor the sleep PDCCH, that is, not perform S101 as shown in FIG. 1. As in the scenario where the duration of the on duration timer is shorter than the preset time threshold, the UE has relatively few PDCCH monitoring occasions during the on duration, the UE may not monitor the sleep PDCCH to ensure performance of data transmission.

In some embodiments, the DCI further includes a duration of entering the sleep mode which is a number of DRX cycles.

In some embodiments, S101 as shown in FIG. 1 may include: monitoring the sleep PDCCH in a common search space, and descrambling CRC of the sleep PDCCH using a new RNTI. Based on the descrambling being successful, it is determined that the sleep PDCCH is detected.

In some embodiments, the UE may monitor the sleep PDCCH in the common search space and determine whether it is a sleep PDCCH. The monitoring may include: using a new RNTI to descramble the PDCCH, and based on the descrambling being successful, determining that the PDCCH is a sleep PDCCH. The new RNTI refers to an RNTI different from an original RNTI to distinguish the sleep PDCCH from the original PDCCH.

In some embodiments, a size of the DCI may be 56 bits.

Specifically, said descrambling of the PDCCH may include performing CRC descrambling on the PDCCH.

Further, the sleep indication information includes a bit corresponding to a position of the UE on a bitmap. Based on the sleep PDCCH being detected, the UE may detect the bit at the corresponding position in the sleep indication information to determine to enter the sleep mode.

In some embodiments, the sleep indication information may be carried in the DCI in the form of a bitmap, and the UE may determine whether the UE enters a sleep mode by checking a value of the corresponding bit in the bitmap. For example, if the bit value is 0, the UE does not enter the sleep mode, and when the bit value is 1, the UE enters the sleep mode. A number of bits of the sleep indication information (i.e., the bitmap) is configured by high-layer signaling, such as RRC signaling, and selected from a group consisting of 30 and 56 so as to be the same as a size of the DCI.

Alternatively, the sleep indication information may be carried in the DCI in the form of an identity list of the UE, and the identity list includes the identity of at least one UE that needs to enter a sleep mode. The UE determines whether to enter the sleep mode by checking whether its own identity exists in the identity list.

Further, the identity of the UE is an index or a number of the UE.

Alternatively, in some embodiments, S101 as shown in FIG. 1 may be monitoring the PDCCH. The PDCCH refers to the PDCCH that needs to be monitored during active time.

In some embodiments, the UE may monitor the PDCCH at a PDCCH monitoring occasion within the active time, so as not to increase the PDCCH monitoring occasion and power consumption of the UE.

Figure 2:
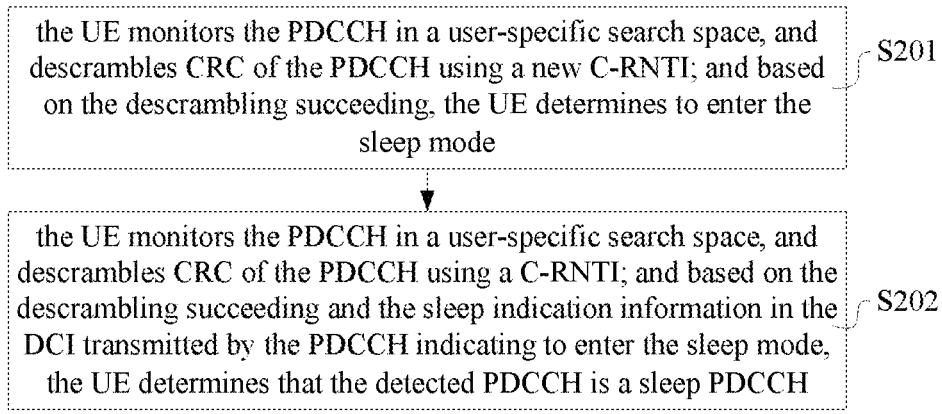
FIG. 2 is a flow chart of S101 as shown in FIG. 1 according to an embodiment.

Referring to FIG. 2, in some embodiments, S101 as shown in FIG. 1 includes S201 or S202.

In S201, the UE monitors the PDCCH in a user-specific search space, and descrambles CRC of the PDCCH using a new C-RNTI; and based on the descrambling succeeding, the UE determines to enter the sleep mode.

In S202, the UE monitors the PDCCH in a user-specific search space, and descrambles CRC of the PDCCH using a C-RNTI; and based on the descrambling succeeding and the sleep indication information in the DCI transmitted by the PDCCH indicating to enter the sleep mode, the UE determines that the detected PDCCH is a sleep PDCCH. Generally, the detected PDCCH is a scheduling PDCCH.

In some embodiments, the UE may selectively perform S201 or S202 according to actual application requirements.

In some embodiments, the UE may monitor the PDCCH in the specific search space and determine whether it is a sleep PDCCH. The monitoring may include the UE using a new C-RNTI to descramble CRC of the PDCCH, and based on the descrambling succeeding, determining that the sleep PDCCH is detected. The new C-RNTI refers to a C-RNTI different from an original C-RNTI to distinguish the sleep PDCCH from an original PDCCH.

Alternatively, the monitoring may include using C-RNTI (that is, the original C-RNTI) to descramble the CRC of the PDCCH, and based on the descrambling succeeding, obtaining the DCI transmitted by the PDCCH. Based on the sleep indication information in the DCI transmitted by the PDCCH indicating to enter a sleep mode, the UE determines to enter the sleep mode.

Specifically, said descrambling the CRC of the PDCCH may include performing CRC descrambling on the PDCCH.

Further, the sleep indication information indicating to enter the sleep mode includes a newly added DCI field containing the sleep indication information, or an original DCI field indicating an invalid state.

In an application scenario, the original DCI format has 50 bits, and one bit may be added as a new DCI field to carry the sleep indication information. If a value of the new DCI field is 1, the UE enters a sleep mode; or if the value of the new DCI field is 0, the UE does not enter the sleep mode.

In another application scenario, a particular DCI field in the original DCI format has 3 bits and can indicate 8 states two of which are invalid states, for example, 110 and 111. Based on the original DCI field indicating an invalid state, that is, the values of the original DCI field are 110 and 111, the UE determines that the PDCCH is a sleep PDCCH.

The DCI format of the sleep PDCCH is a DCI format used to schedule a PDSCH.

In some embodiments, the DCI format of the sleep PDCCH is a DCI format used to schedule a PDSCH.

In some embodiments, the DCI format of the sleep PDCCH may be an original DCI format, for example, the DCI format used to schedule the PDSCH. Further, the UE can use the original DCI format to analyze the DCI of the sleep PDCCH to avoid increase of the number of times of blind detection caused by changing a size of the DCI.

Further, the DCI format used to schedule PDSCH includes the DCI format used for scheduling a non-broadcast PDSCH. Specifically, the size of the DCI is 56 bits.

In some embodiments, the UE may use the DCI format for scheduling the non-broadcast PDSCH to analyze the DCI of the sleep PDCCH, so that the UE does not need to monitor the DCI format for scheduling non-broadcast PDSCH in a connected state.

In some embodiments, the DCI format used for scheduling PDSCH includes a DCI format used for scheduling a broadcast PDSCH. Specifically, a size of the DCI is 30 bits.

In some embodiments, the DCI further includes monitoring indication information which indicates whether the UE monitors the PDCCH after entering the sleep mode. The method may further include: following entering the sleep mode, determining whether to monitor the PDCCH based on the monitoring indication information.

In some embodiments, the monitoring indication information in the DCI may indicate whether the UE monitors the PDCCH after entering the sleep mode, so that the UE can also monitor a small amount of PDCCH after entering the sleep mode, thereby improving performance of the UE.

Figure 3:
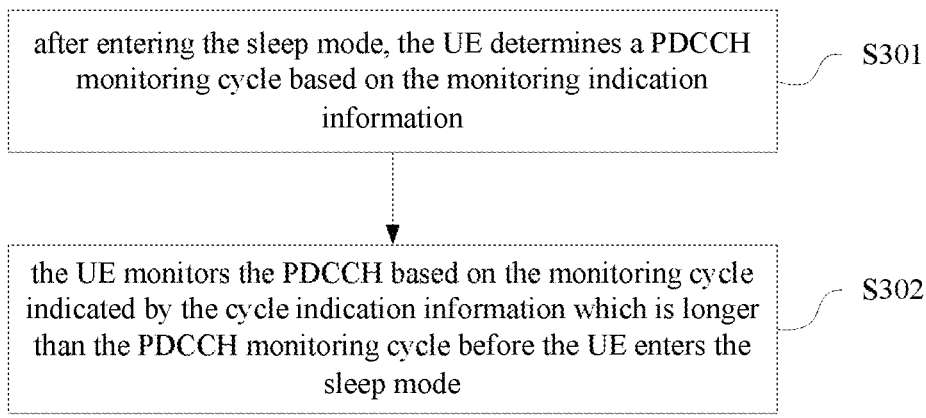
FIG. 3 is a partial flow chart of a method for entering a sleep mode according to an embodiment.

Further, the DCI further includes cycle indication information to indicate to the UE a PDCCH monitoring cycle after entering the sleep mode. Referring to FIG. 3, the method further includes S301 and S302.

In S301, after entering the sleep mode, the UE determines a PDCCH monitoring cycle based on the monitoring indication information.

In S302, the UE monitors the PDCCH based on the monitoring cycle indicated by the cycle indication information which is longer than the PDCCH monitoring cycle before the UE enters the sleep mode.

In some embodiments, the cycle indication information may directly indicate a specific value of the monitoring cycle, and may include a multiple of the PDCCH monitoring cycle before the UE enters the sleep mode, where the multiple is a positive integer greater than 1.

In some embodiments, the UE may monitor the PDCCH based on the monitoring cycle indicated by the cycle indication information to obtain scheduling information, which is conducive to the base station configuring the number or density of monitoring the PDCCH by the UE.

In some embodiments, the DCI further includes first resource indication information to indicate to the UE a number of carriers of PDCCH monitoring, a start position of the carriers, and/or a maximum number of repetitions of the carriers after entering the sleep mode.

By indicating to the UE the number of carriers of PDCCH monitoring, a start position of the carriers, and/or a maximum number of repetitions of the carriers after entering the sleep mode, the base station may easily configure a total number of frequency domain resources and time domain resources for the UE to monitor the PDCCH.

In some embodiments, the method as shown in FIG. 1 further includes: after entering the sleep mode, determining whether to monitor and wake up the PDCCH based on the sleep indication information.

In some embodiments, the sleep indication information further indicates whether the UE monitors a wake-up PDCCH after entering sleep, where the wake-up PDCCH can indicate whether the UE enters a wake-up mode, and entering the wake-up mode refers to starting an on duration timer or starting DRX inactivity timer. In this way, the sleep PDCCH and the wake-up PDCCH may flexibly cooperate with each other, and the UE monitors the PDCCH more flexibly.

Further, the sleep indication information further includes second resource indication information to instruct to the UE a number of carriers of wake-up PDCCH monitoring, a start position of the carriers, and/or a maximum number of repetitions.

In some embodiments, by indicating the number of carriers of wake-up PDCCH monitoring, the start position of the carriers, and/or the maximum number of repetitions, the base station may easily configure a total number of frequency domain resources and time domain resources for the UE to monitor the PDCCH.

In some embodiments, the UE determines whether to modify PDCCH configuration after entering the sleep mode based on high-layer signaling from the base station.

In some embodiments, as the UE can enter the sleep mode in various ways, such as skipping a duration of PDCCH monitoring occasions, or modifying the PDCCH configuration, high-layer signaling may be used to indicate the specific way of the UE entering the sleep mode, that is, to instruct the UE to skip a duration of the PDCCH monitoring occasions, or modify the PDCCH configuration.

Further, the high-layer signaling indicates whether to modify the PDCCH monitoring cycle, where the modified PDCCH monitoring cycle is longer than a PDCCH monitoring cycle before the UE enters the sleep mode.

Figure 4:
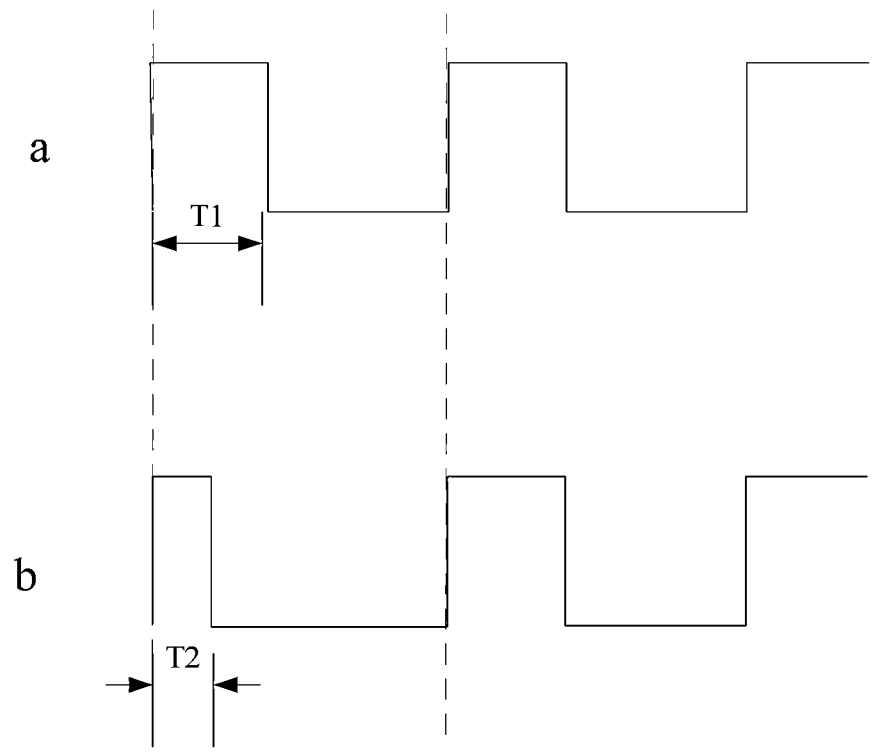
FIG. 4 is a diagram of an application scenario according to an embodiment.

In an application scenario, referring to FIG. 4, the base station configures a semi-static DRX cycle for the UE in a connected state, where an on duration timer is turned on by default at the beginning of the DRX cycle, and length of the on duration timer is T1 as shown in a in FIG. 4, which is, for example, 10 ms.

Those skilled in the art could understand that the DRX cycle and the length of the on duration timer turned on by default may be adaptively configured, which is not limited in the embodiments of the present disclosure.

In some scenarios, the UE is in a narrowband system, and a packet arrival rate in these scenarios is relatively low. The UE may monitor the PDCCH in the on duration timer. For example, the UE detects the PDCCH at the 80th ms in the on duration timer, and obtains sleep indication information indicating the UE to enter the sleep mode. Therefore, the UE's active time (high-level line) is as shown in FIG. 4.

The on duration timer in a current DRX cycle (shown by the dashed line in FIG. 4) has a duration of 160 ms, as shown in T1. The UE enters the sleep mode after monitoring the PDCCH and obtaining the sleep indication information. Based on the signaling, the UE skips the PDCCH monitoring occasion of 80 ms, and thus the UE merely monitors the PDCCH within the first 80 ms after the on duration timer is started, as shown in T2.

Figure 5:
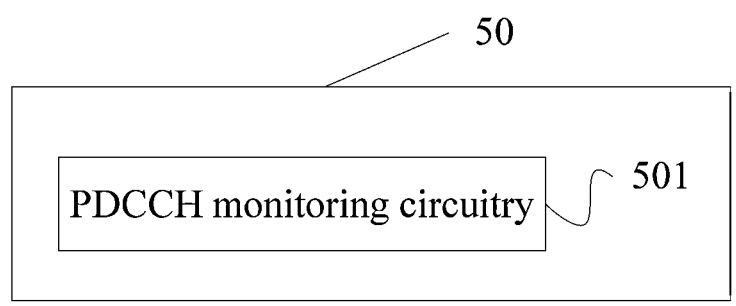
FIG. 5 is a structural diagram of an apparatus for entering a sleep mode according to an embodiment.

Referring to FIG. 5, FIG. 5 is a structural diagram of an apparatus 50 for entering a sleep mode according to an embodiment. The apparatus 50 includes a PDCCH monitoring circuitry 501 configured to monitor a PDCCH and determine whether to enter a sleep mode, wherein entering the sleep mode includes skipping a duration of PDCCH monitoring occasions or modifying PDCCH configuration.

In embodiments of the present disclosure, whether to enter a sleep mode is determined by monitoring a PDCCH. On one hand, power consumption of UEs may be reduced in scenarios having a low packet arrival rate or network congestion. On the other hand, there is no need to use MAC layer commands to instruct UEs to enter a sleep mode, thereby saving time and frequency resources.

More details of working principles and working modes of the apparatus 50 can be found in the above descriptions of FIGS. 1 to 3, and are not described here.

In an embodiment of the present disclosure, a storage medium having computer instructions stored therein is provided, wherein when the computer instructions are executed, any one of the above methods as shown in FIG. 1, 2 or 3 is performed. The storage medium may include a Read Only Memory (ROM), a Random Access Memory (RAM), a magnetic disk or an optical disk. In some embodiments, the storage medium may be a computer readable storage medium, such as a non-volatile memory or a non-transitory memory.

In an embodiment of the present disclosure, a UE including a memory and a processor is provided, wherein the memory has computer instructions stored therein, and when the processor executes the computer instructions, the method as shown in FIG. 1, 2 or 3 is performed. The UE may include but not limited to terminal devices such as mobile phones, computers or tablets.

A UE in the embodiments of the present disclosure may refer to various forms of access terminal, user unit, user station, Mobile Station (MS), remote station, remote terminal, mobile equipment, user terminal, terminal equipment, wireless communication equipment, user agent or user device. The UE may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

A base station (BS) in the embodiments of the present disclosure may also be referred to as a base station equipment, and is a device deployed in a Radio Access Network (RAN) to provide radio communication functions. For example, an equipment that provides a base station function in a 2G network includes a Base Transceiver Station (BTS) and a Base Station Controller (BSC). An equipment that provides the base station function in a 3G network includes a Node B and a Radio Network Controller (RNC). An equipment that provides the base station function in a 4G network includes an evolved node B (eNB). In a Wireless Local Area Network (WLAN), an equipment that provides the base station function is an Access Point (AP). An equipment that provides the base station function in a 5G New Radio (NR) includes gNB and a continuously evolved Node B (ng-eNB), where gNB and the terminal use NR technology for communication, ng-eNB and the terminal use Evolved Universal Terrestrial Radio Access (E-UTRA) technology for communication, and both gNB and ng-eNB can be connected to a 5G core network. And the base station also refers to an equipment that provides the base station function in a new communication system in the future.

It should be understood that the term "and/or" in the present disclosure is merely an association relationship describing associated objects, indicating that there can be three types of relationships, for example, A and/or B can represent "A exists only, both A and B exist, B exists only. In addition, the character "/" in the present disclosure represents that the former and latter associated objects have an "or" relationship.

The "plurality" in the embodiments of the present disclosure refers to two or more.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

The above embodiments may be implemented in whole or in part by software, hardware, firmware or any combination thereof. When implemented in software, the above embodiments may be implemented in whole or in part in the form of a computer program product. The computer program product includes one or more computer instructions or computer programs. The procedures or functions according to the embodiments of the present disclosure are wholly or partially generated when the computer instructions or the computer programs are loaded or executed on a computer. The computer may be a general purpose computer, a special purpose computer, a computer network, or other programmable device. The computer instructions may be stored in a computer readable storage medium or transmitted from one computer readable storage medium to another computer readable storage medium, for example, the computer instructions may be transmitted from one website, computer, server or data center to another website, computer, server or data center by wire (e.g., infrared, wireless, microwave and etc.). The computer readable storage medium may be any available medium that can be accessed by a computer or a data storage device such as a server or a data center that contains one or more sets of available media. The available medium may be a magnetic medium (e.g., floppy disk, hard disk or magnetic tape), an optical medium (e.g., DVD), or a semiconductor medium. The semiconductor medium may be a solid disk.

It should be understood that, in the various embodiments of the present disclosure, sequence numbers of the above-mentioned processes do not represent an execution sequence, and the execution sequence of each process should be determined by its function and inherent logic, which does not limit an implementation process of the embodiments of the present disclosure.

In the above embodiments of the present disclosure, it should be understood that the disclosed method, device and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

The integrated units implemented in the form of the software functional unit may be stored in a computer readable storage medium. The software functional unit is stored in a storage medium and includes several instructions for causing a computer device (a personal computer, a server or a network device) to execute some steps of the methods in the embodiments of the present disclosure. And the storage medium may be a medium for storing program codes, such as a U disk, a removable hard disk, a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit d scope of the present disclosure.

What is claimed is:

1. A method for entering a sleep mode, comprising:
monitoring a Physical Downlink Control Channel (PDCCH) and determining whether to enter a sleep mode, wherein entering the sleep mode comprises skipping a duration of PDCCH monitoring occasions or modifying a configuration of the PDCCH;
wherein based on monitoring being completed on the PDCCH ending in frame n and it being determined to enter the sleep mode, any one of following actions is performed:
not monitoring the PDCCH on any frame from (n+1)th to (n+k−1)th frames, where ACK/NACK feedback indicated by the PDCCH starts at an (n+k)th frame; or
not monitoring the PDCCH on any frame from (n+1)th to (n+k−1)th frames, where a Physical Downlink Shared Channel (PDSCH) scheduled by the PDCCH ends at an (n+k)th frame;
wherein n and k are integers.

2. The method according to claim 1, wherein prior to monitoring the PDCCH, the method further comprises:
determining whether to modify the configuration of the PDCCH after entering the sleep mode based on high-layer signaling from a base station.

3. The method according to claim 2, wherein the high-layer signaling indicates whether to modify a PDCCH monitoring cycle, wherein a modified PDCCH monitoring cycle is longer than the PDCCH monitoring cycle before a UE enters the sleep mode.

4. The method according to claim 3, wherein the high-layer signaling comprises a multiple of the PDCCH monitoring cycle before the UE enters the sleep mode.

5. A non-transitory storage medium storing one or more programs, the one or more programs comprising computer instructions, which, when executed by a processor, cause the processor to:
monitor a Physical Downlink Control Channel (PDCCH) and determine whether to enter a sleep mode, wherein entering the sleep mode comprises skipping a duration of PDCCH monitoring occasions or modifying a configuration of the PDCCH;
wherein based on monitoring being completed on the PDCCH ending in frame n and it being determined to enter the sleep mode, the processor is further caused to perform any one of following actions:
not monitoring the PDCCH on any frame from (n+1)th to (n+k−1)th frames, where ACK/NACK feedback indicated by the PDCCH starts at an (n+k)th frame; or
not monitoring the PDCCH on any frame from (n+1)th to (n+k−1)th frames, where a Physical Downlink Shared Channel (PDSCH) scheduled by the PDCCH ends at an (n+k)th frame;
wherein n and k are integers.

6. A user equipment comprising a memory and a processor, wherein the memory stores one or more programs, the one or more programs comprising computer instructions, which, when executed by the processor, cause the processor to:
  monitor a Physical Downlink Control Channel (PDCCH) and determining whether to enter a sleep mode, wherein entering the sleep mode comprises skipping a duration of PDCCH monitoring occasions or modifying a configuration of the PDCCH;
  wherein based on monitoring being completed on the PDCCH ending in frame n and it being determined to enter the sleep mode, the processor is further caused to perform any one of following actions:
    not monitoring the PDCCH on any frame from (n+1)th to (n+k−1)th frames, where ACK/NACK feedback indicated by the PDCCH starts at an (n+k)th frame; or
    not monitoring the PDCCH on any frame from (n+1)th to (n+k−1)th frames, where a Physical Downlink Shared Channel (PDSCH) scheduled by the PDCCH ends at an (n+k)th frame;
  wherein n and k are integers.

* * * * *